United States Patent [19]

Collins et al.

[11] Patent Number: 4,866,223
[45] Date of Patent: Sep. 12, 1989

[54] SEAT BELT RETRACTOR HAVING INTEGRAL SEAT BELT WARNING SWITCH

[75] Inventors: Cecil A. Collins, Sterling Heights; Joseph Smola, E. Detroit, both of Mich.

[73] Assignee: General Safety Corporation, St. Clair Shores, Mich.

[21] Appl. No.: 234,075

[22] Filed: Aug. 19, 1988

[51] Int. Cl.$^4$ .............................................. H01H 3/16
[52] U.S. Cl. .......................... 200/61.16; 200/61.58 B
[58] Field of Search ............... 200/61.13, 61.15, 61.16, 200/61.58 B, 158, 153 LA, 500, 573

[56] References Cited

U.S. PATENT DOCUMENTS

| | | | |
|---|---|---|---|
| 3,506,305 | 4/1970 | Eineman, Jr. et al. | 200/61.16 X |
| 3,667,698 | 6/1972 | Fisher | 242/107.4 |
| 3,862,727 | 1/1975 | Fisher | 242/107.4 R |
| 3,956,603 | 5/1976 | Fisher | 200/61.58 B |
| 4,002,311 | 1/1977 | Fisher et al. | 242/107.7 |
| 4,034,931 | 7/1977 | Fisher et al. | 242/107.4 D |
| 4,149,683 | 4/1979 | Fisher et al. | 242/107.7 |
| 4,165,054 | 8/1979 | Collins | 242/107.7 |

Primary Examiner—J. R. Scott
Attorney, Agent, or Firm—Harness, Dickey & Pierce

[57] ABSTRACT

A seat belt retractor for motor vehicle applications having a switch assembly for controlling a seat belt warning indicator or other electrical circuits requiring an input of belt webbing extension or retraction. The switch assembly includes a cam disk which is rotatable with the retractor spool having generally spiral grooves on one of its radial face surfaces. A follower, made of an electrically conductive material, engages the grooves and is moved radially in response to the rotated position of the spool. When the follower reaches a predetermined radial position, the follower engages the electrical contacts, thereby closing an electrical circuit.

8 Claims, 2 Drawing Sheets

SEAT BELT RETRACTOR HAVING INTEGRAL SEAT BELT WARNING SWITCH

BACKGROUND AND SUMMARY OF THE INVENTION

This invention relates to a seat belt retractor for motor vehicle applications and particularly to one having a switch assembly for providing an output when a predetermined amount of seat belt webbing is withdrawn from the retractor.

Modern motor vehicles are required to have an occupant collision protection system. The most popular of such systems are seat belts which physically restrain the occupants during vehicle impacts and maneuvers. As a means of reminding the occupant of the necessity of deploying the restraint system, a warning light or other indicator is often provided. One approach for controlling such a warning indicator is to detect extension of the seat belt webbing which occurs when the belt is deployed.

In accordance with the present invention, a seat belt retractor is provided having a switch assembly incorporating a grooved cam plate which rotates with the retractor spool and has a spiral cam groove formed on one radial surface thereof. A follower which is confined to move in a radial direction engages the cam grooves. Rotation of the spool and cam causes the follower to move in a radial direction. Electrical contacts are actuated in response to the position of the follower to control auxiliary systems such as warning indicators.

The switch assembly in accordance with this invention is extremely simple in construction and has a minimum of moving parts. In addition, the mechanism can be compactly packaged into a retractor which is a considerable advantage in view of the stringent packaging constraints imposed on present motor vehicle designs.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
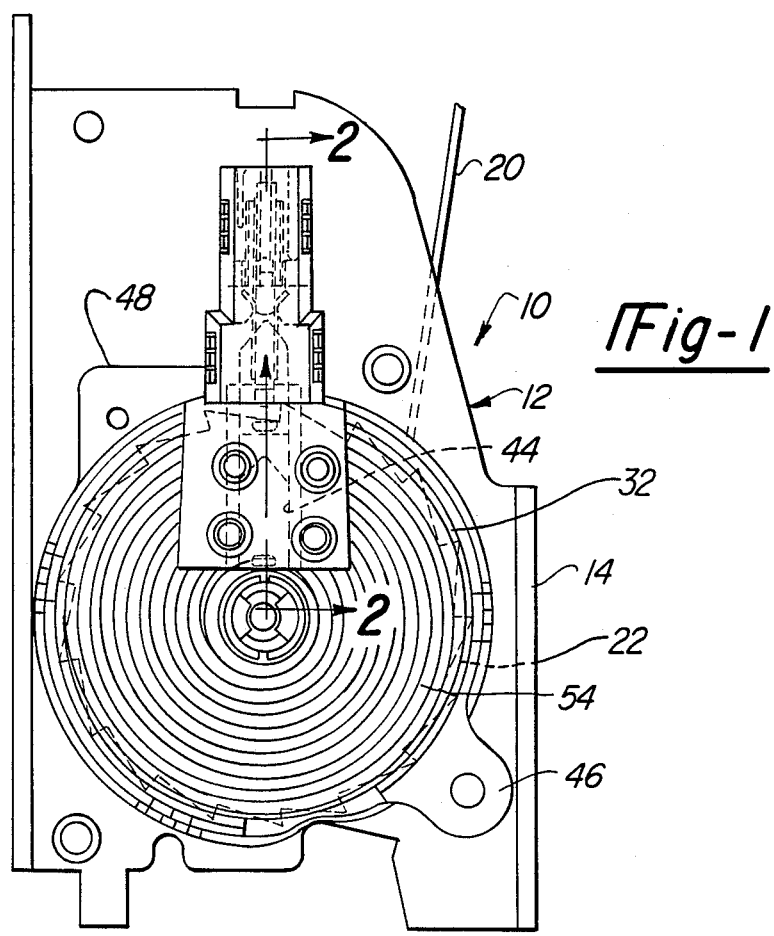
FIG. 1 is a side elevational view of a seat belt retractor in accordance with this invention particularly showing the switch assembly.
Figure 2:
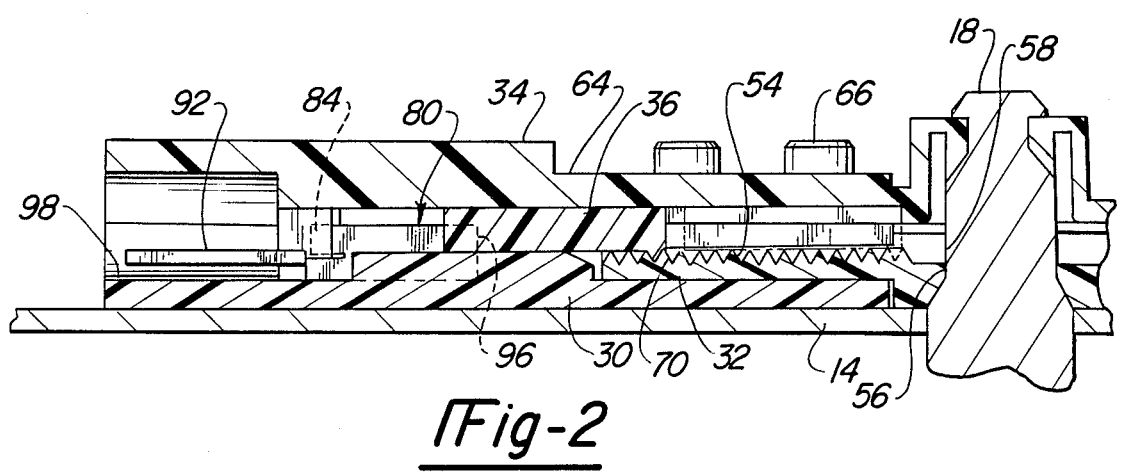
FIG. 2 is a cross-sectional view taken along line 2—2 of FIG. 1.
Figure 3:
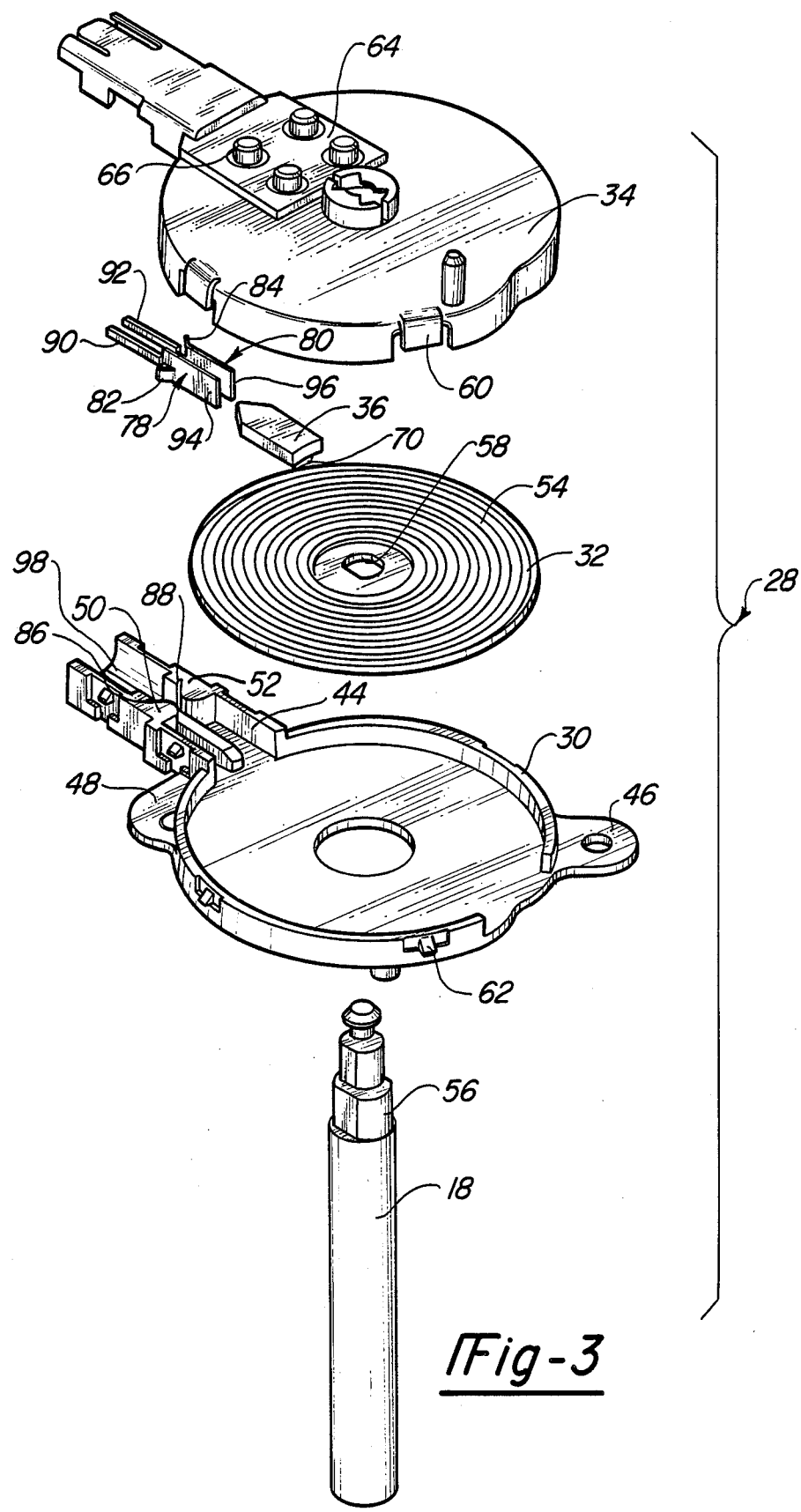
FIG. 3 is an exploded pictorial view of components making up the switch assembly of this invention.

A seat belt retractor assembly in accordance with this invention is shown in FIG. 1 and is generally designated by reference number 10. Seat belt retractor 10 includes retractor frame 12 having provisions for fixedly mounting it to a motor vehicle structure. Frame 12 defines a pair of side plates 14 having bearing apertures for supporting spool shaft 18 for rotation. Seat belt webbing 20 is attached to spool shaft 18 enabling it to be rolled thereon. The axial ends of spool shaft 18 carry end flanges 22. For retractors having inertia sensitive actuators for emergency locking capability, a locking bar and inertia sensitive pendulum (not shown) may be provided which engage with ramp shaped teeth on end flanges 22. Retractor 10 also includes a rewind spring assembly (not shown) coupled to spool shaft 18 for exerting a rotational bias on the spool shaft for retracting webbing 20.

Retractor 10 includes switch assembly 28 according to this invention which is affixed to side plate 14. Switch assembly 28 principally comprises base plate 30, cam disk 32, cover 34 and follower 36. Base plate 30 is fixedly mounted to side plate 14 by ears 46 and 48 and forms a radially projecting passageway 44. Passageway 44 defines a pair of inwardly directed ribs 50 and 52 which serve to mount electrical terminal blades, as will be described in greater detail hereinafter. Cam disk 32 is positioned within base plate 30 and is rotatable therein. Cam disk 32 defines a helix shaped groove 54 in much the same fashion as a phonograph record (but with a much greater pitch and depth). Spool shaft 18 has a drive section 56 having flattened sides enabling it to rotationally drive cam disk 32 which has a central aperture 58 of a corresponding shape. Cover 34 encloses cam disk 32 and has tabs 60 which snap fit into engagement with base plate teeth 62. Plate 64 is affixed to cover 34 by fasteners 66.

Follower 36 has a pin or tab 70 which fits within cam disk groove 54. Follower 36 is confined to travel in a radial direction through pasasgeway 44. Depending on the desired mode of operation, follower 36 could be caused to move to its radially inner extreme position in response to either retraction or extension of webbing 20. For the embodiment described herein, follower 63 is at its radially inward "home" position when the webbing is fully retracted and is made of a conductive material so that it can pass current when it touches a pair of contacts.

Electrical contacts 78 and 80 are positioned within passageway 44 and include bent ears 82 and 84 which fit into correspondingly shaped slots 86 and 88 to maintain them in position. Blades 94 and 96 project in a radially inward direction. Electrical contacts 78 and 80 further form projecting terminal pins 90 and 92, respectively. When cover 34 is fastened to base plate 30, an open cavity 98 is provided which is configured to engage a connector plug (not shown) with conductors contacting pins 90 and 92.

In operation, the radial position of follower 36 is dependent upon the rotated position of cam disk 32 and, therefore, the position of the follower provides an indication of the amount of webbing extended from the retractor. When webbing 20 is at a predetermined position, follower 36 touches electrical contacts 78 and 80, thereby closing the circuit therebetween.

Switch assembly 28 can be modified such that cam disk 32 has grooves which are not of a smooth involute form but rather provide abrupt changes in the radial position of follower 36 in accordance with design requirements relating to the switching system being actuated. The grooves could also be arranged such that portions of cam disk 32 have grooves of varying pitch as another means of custom tailoring the radial position runout behavior of follower 36 with respect to the rotated position of spool shaft 18.

While the above description constitutes the preferred embodiments of the present invention, it will be appreciated that the invention is susceptible of modification, variation and change without departing from the proper scope and fair meaning of the accompanying claims.

We claim:

1. A switch assembly for a seat belt retractor for providing an output in response to the rotated position of a belt webbing spool comprising:
   a cam disk rotatable with said webbing spool and defining a spiral cam groove on one face surface thereof,
   a follower engaging said groove, said follower made from an electrically conductive material,
   means for confining said follower to move along a generally radial path such that the radial position of said follower is determined by the rotated position of said spool, and
   electrical switch means for providing said output when said follower engages said electrical switch means such that said follower closes an electrical circuit.

2. A switch assembly according to claim 1 wherein said means for confining comprises a housing member having a pair of upstanding walls defining a radial slot for confining said follower.

3. A switch assembly according to claim 2 wherein said electrical switch means comprises a pair of electrical contacts which are engageable with said follower, said electrical contacts supported within said housing.

4. A switch assembly according to claim 3 wherein said follower is made of an electrically conductive material such that said follower closes an electrical circuit when it touches said contacts.

5. A switch assembly according to claim 3 wherein said radial slot further defines an open cavity for receiving an electrical connector engageable with said contacts.

6. A switch assembly for a seat belt retractor for providing an output in response to the rotated position of a belt webbing spool comprising:
   a retractor frame having a pair of end plates supporting said spool for rotation, said spool having a spool shaft passing through an aperture through one of said end plates,
   a cam disk having a central aperture receiving said spool shaft and rotatably driven by said spool shaft, said cam disk defining a single spiral groove on a radial surface thereof,
   a follower engaging said groove, said follower being made from an electrically conductive material,
   a housing enclosing said cam disk and defining a radial path for said follower, such that the radial position of said follower is dependent on the rotated position of said spool, and
   electrical contact means held by said housing such that said follower engages said electrical contact means to change the circuit condition across said electrical contact means.

7. A switch assembly according to claim 6 wherein said electrical contact means comprises a pair of electrical contacts mounted to said housing.

8. A switch assembly according to claim 7 wherein said follower is made of an electrically conductive material such that said follower closes an electrical circuit when it touches said contacts.

* * * * *